Sept. 21, 1937.   B. KAHN   2,093,869
INTERNAL COMBUSTION ENGINE
Filed June 16, 1934   8 Sheets—Sheet 1

INVENTOR
Benjamin Kahn

Sept. 21, 1937. B. KAHN 2,093,869
INTERNAL COMBUSTION ENGINE
Filed June 16, 1934 8 Sheets-Sheet 2

INVENTOR
Benjamin Kahn

Sept. 21, 1937. B. KAHN 2,093,869
INTERNAL COMBUSTION ENGINE
Filed June 16, 1934 8 Sheets-Sheet 3

INVENTOR
Benjamin Kahn

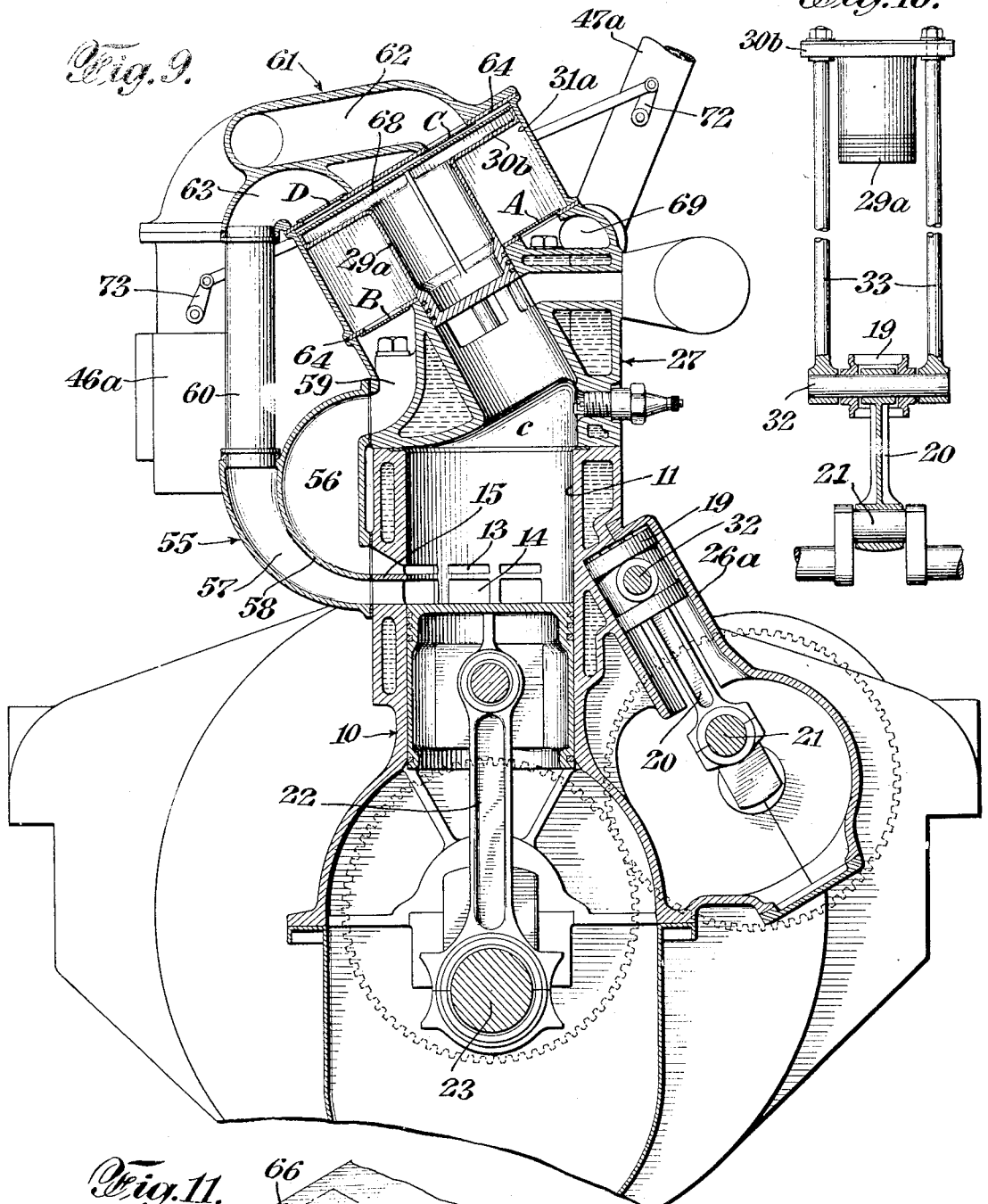
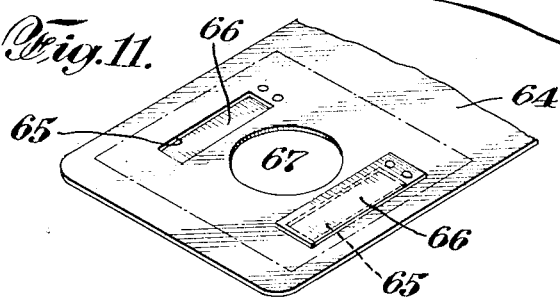

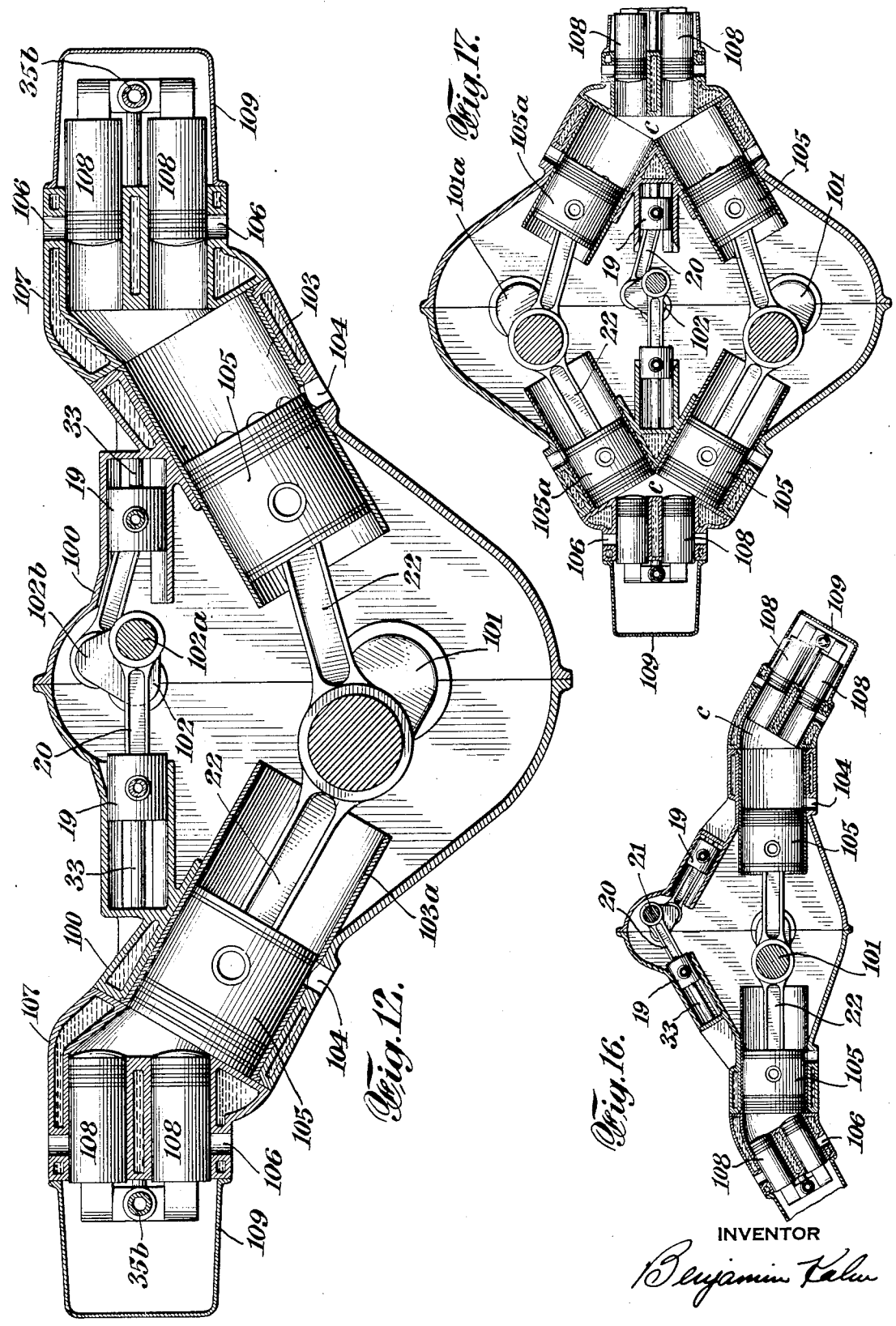

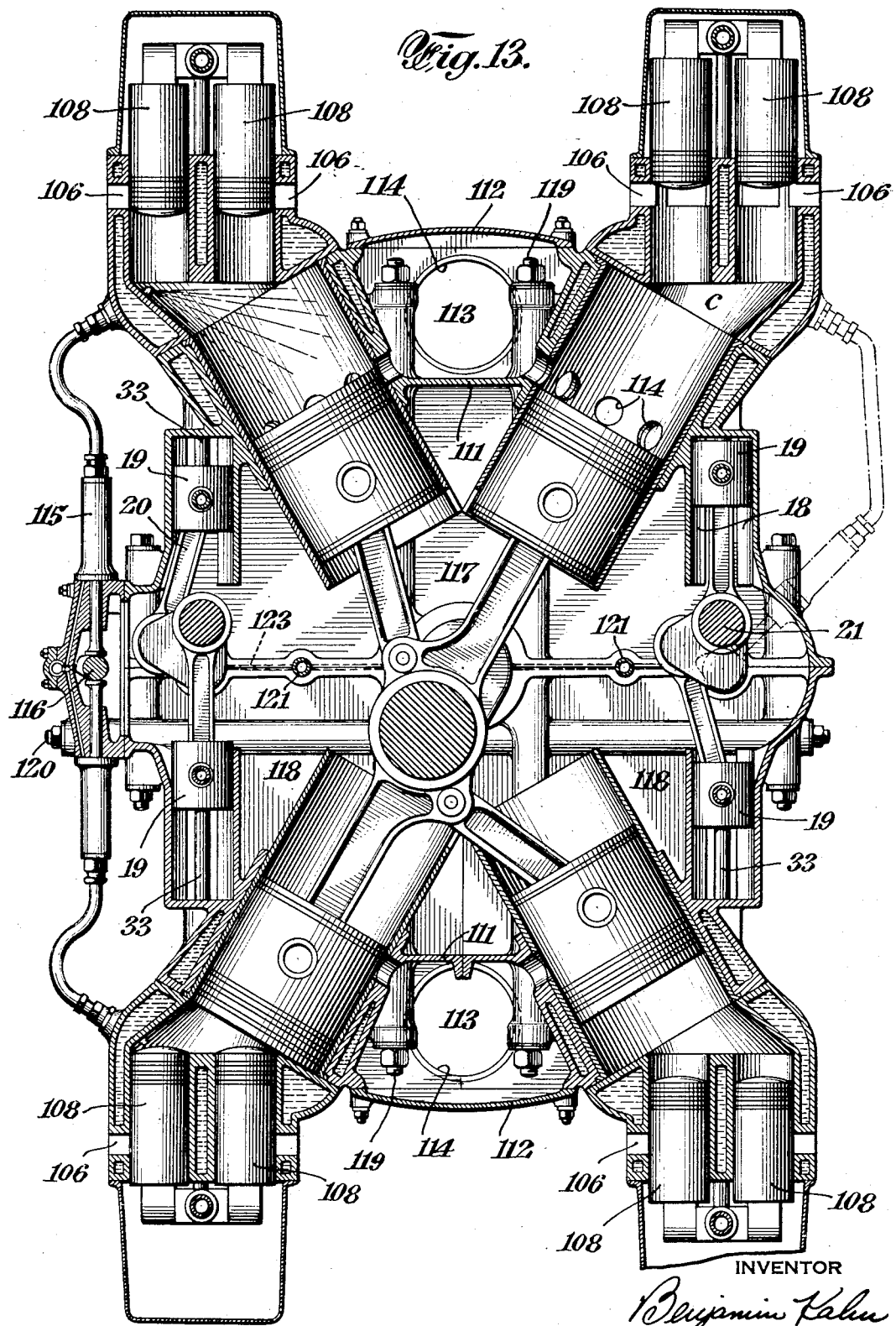

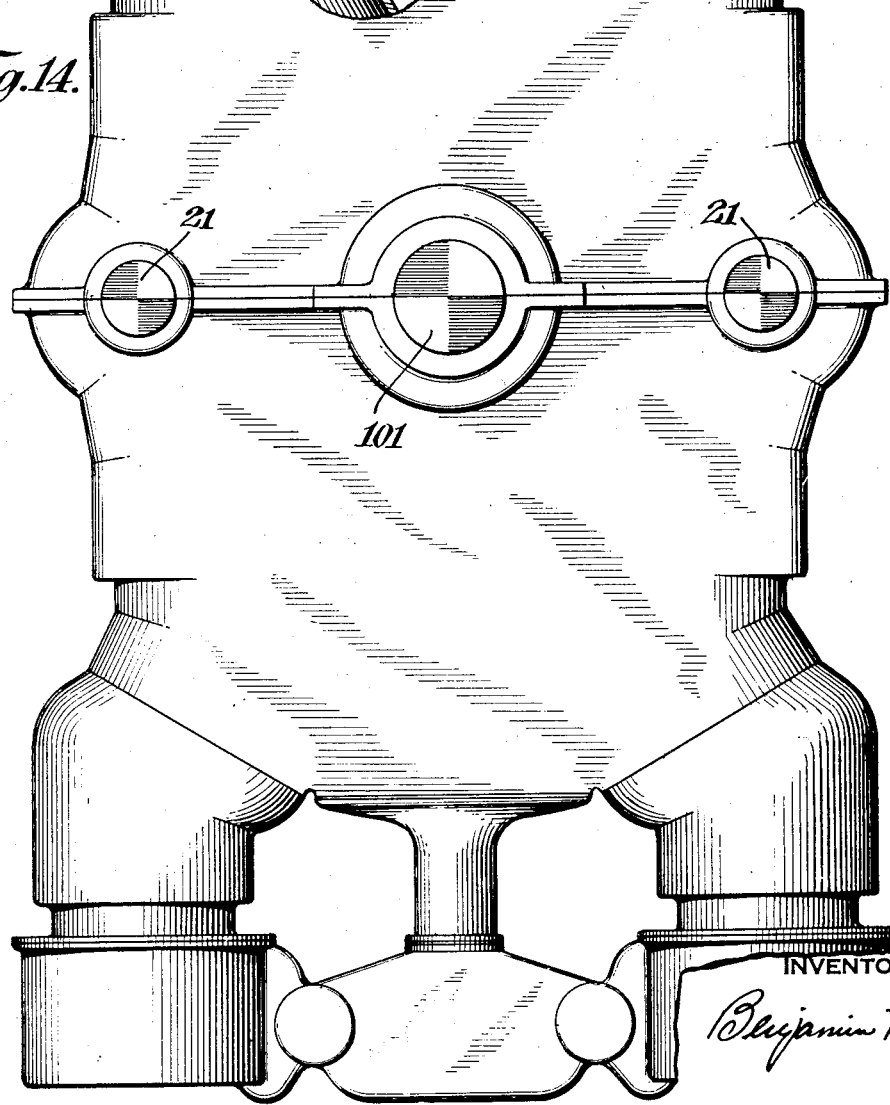

Sept. 21, 1937. B. KAHN 2,093,869
INTERNAL COMBUSTION ENGINE
Filed June 16, 1934 8 Sheets-Sheet 8

INVENTOR
Benjamin Kahn

Patented Sept. 21, 1937

2,093,869

UNITED STATES PATENT OFFICE 2,093,869

INTERNAL COMBUSTION ENGINE

Benjamin Kahn, New York, N. Y., assignor to Kinetic Cycle Research Corporation, New York, N. Y., a corporation of New York Application June 16, 1934, Serial No. 730,870

39 Claims. (Cl. 123—53)

This invention relates to improvements in two stroke cycle internal combustion engines, particularly of the "uniflow" or "end to end" scavenging type, and further relates to improvements in engines of the character described in my application bearing Serial Number 666,418, filed April 17, 1933; and includes among its objects the provision of a compact, light and rugged engine having novel power unit arrangements; novel power contributing and fuel pumping piston arrangements, whereby an engine of high mechanical and thermal efficiency and economy is obtained in a simple manner.

Another object is the provision of an efficient and novel multi-cylinder power unit, capable of efficient employment with various fuel pumping arrangements for various speeds and power requirements, various methods of fuel injection, and high or low pressure cylinder charging requirements.

Another object of the invention is the provision of novel, efficient, double acting, positive displacement pistons working in conjunction and synchronism with said power-contributing pistons, and having novel fuel port and fuel conducting arrangements whereby the quantity and quality of the fuel are equalized in a multi power-unit arrangement, whereby the danger of backfiring is eliminated, and whereby easy starting is achieved.

Further objects, features, and advantages of the invention reside in the various combinations above mentioned which will become more apparent in the following description.

Some of the advantages referred to are achieved by arranging an exhaust-controlling piston or pistons to work at an angle with main inlet-controlling pistons connected in the usual manner to a main crankshaft. The exhaust pistons are arranged to be connected with auxiliary crankshafts substantially adjacent the main crankshaft, and are connected at their free or outer end to their operating means so that they move outward and away from their crankshaft during the expansion stroke of the power unit. This enables double acting pumping pistons to be secured to the free end of the exhaust pistons without interference.

Suitable fluid conducting ports are arranged between the pumping pistons and the intake ports of the main cylinder, and means are arranged for controlling the flow of fluid to and from the pumps.

The positioning of the exhaust-controlling pistons outwardly and its operating means directed inwardly provides unrestricted space for various arrangements for controlling the exhaust events, and the power unit so arranged is capable of operation in various multiple groupings of a plurality of power units forming obtuse or acute V type, X type, "diamond" shaped, and "straight-in-line" type engines.

In order that the invention may be more clearly understood, reference to the drawings, illustrating several forms in the invention, is had.

Figure 1:
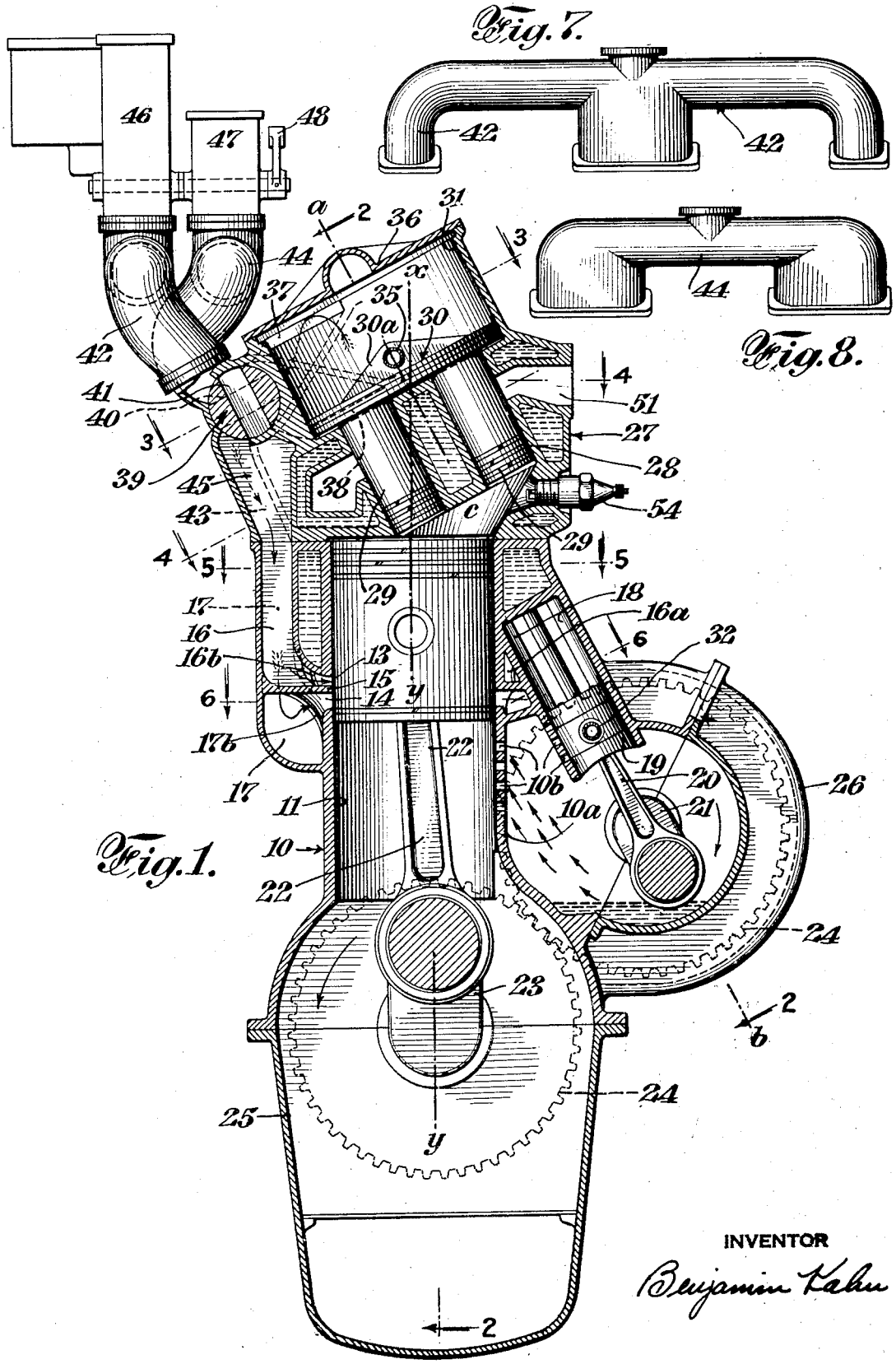
Figure 1 is a transverse section of the cylinder of an "in-line" engine, adaptable for vehicles embodying the invention.

Figures 3, 4, 5 and 6 are longitudinal fragmentary sections on the lines 3—3, 4—4, 5—5 and 6—6, respectively, of Figure 1, with certain parts omitted.

Figures 7 and 8, are views showing the gas and air manifolds respectively.

Figure 9 is a transverse sectional view of another form of the invention, as applied to an engine similar to that shown in Figure 1.

Figure 10 is a fragmentary detail of the auxiliary crankshaft and associated parts of the form shown in Figure 9.

Figure 11 is a fragmentary detail perspective of the carrier plate for the valves used in the engine shown in Figure 9.

Figure 12 is a transverse section of another form of the invention as applied in multiple and showing two power units in a plane transverse to and connected to a main common crankshaft to constitute a V type engine.

Figure 13 is a transverse sectional view of another form of the invention in multiple with four power units in a plane transverse to and connected to a common main crankshaft to constitute an X type engine.

Figure 14 is an elevational view of an engine similar to that shown in Figure 13, with certain modifications, and certain parts shown in section.

Figure 15:
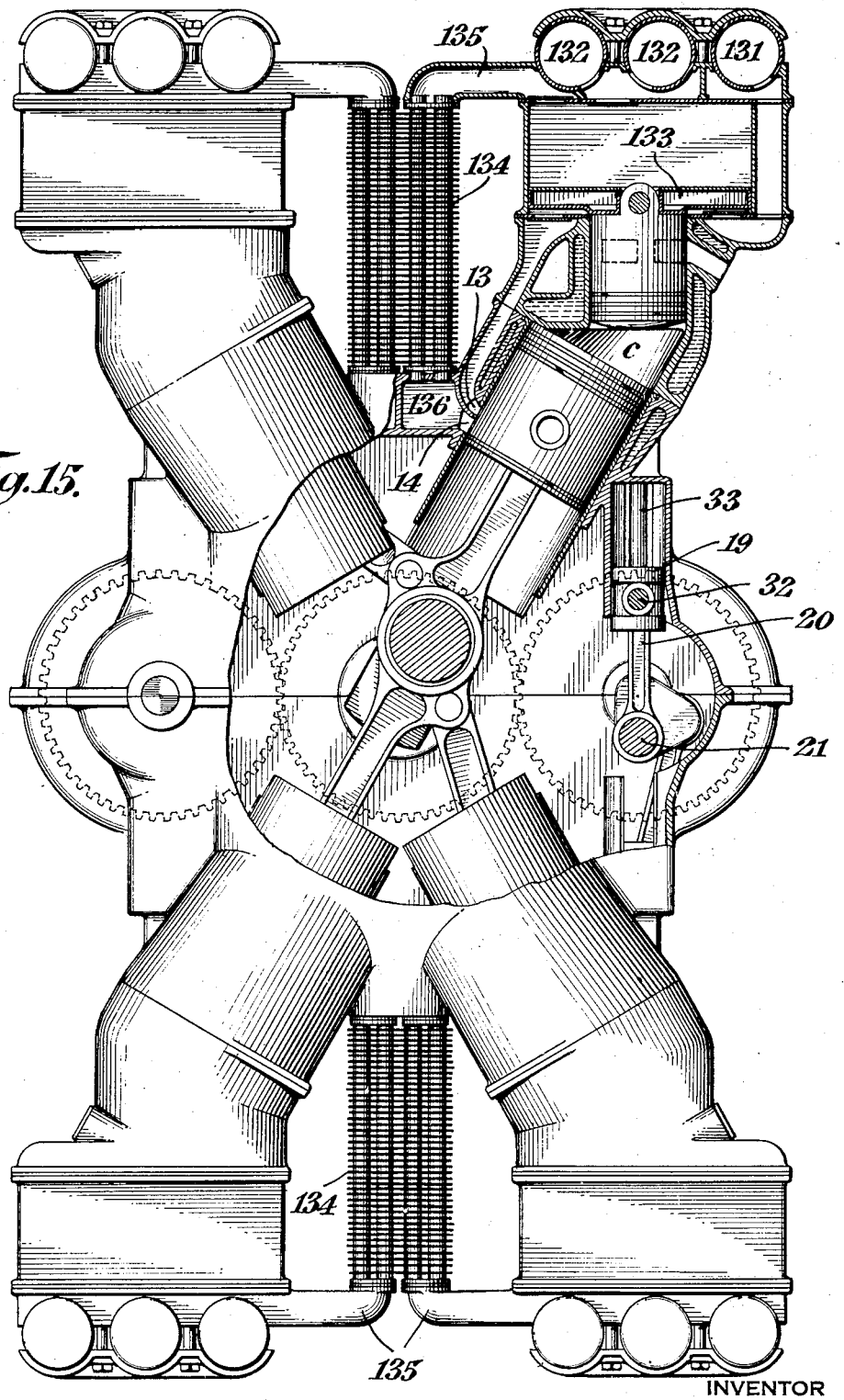

Figure 15 is an elevational view of an engine similar to that shown in Figure 13, with certain other modifications and certain parts shown in section.

Figure 16 is a transverse sectional view of another form of the invention as applied to opposed type engines.

Figure 17 is a transverse section of still another form of the invention as applied to "diamond" shaped engines.

Figure 4:
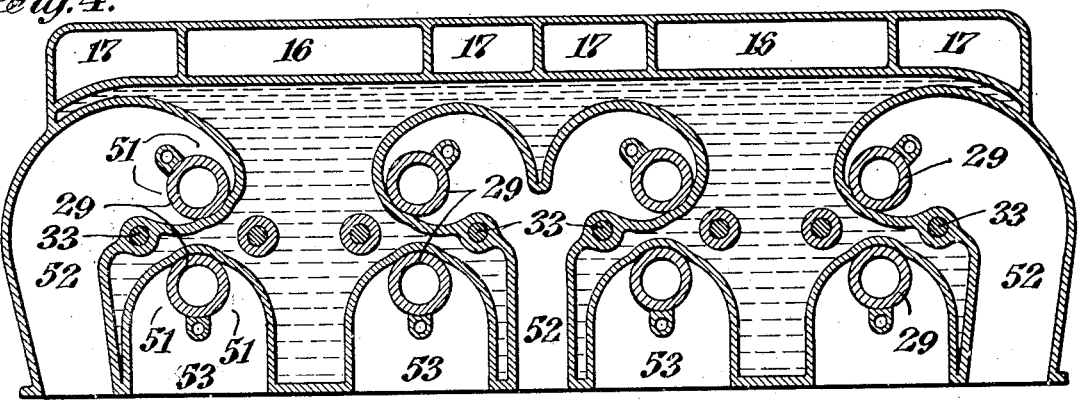
Figure 5:
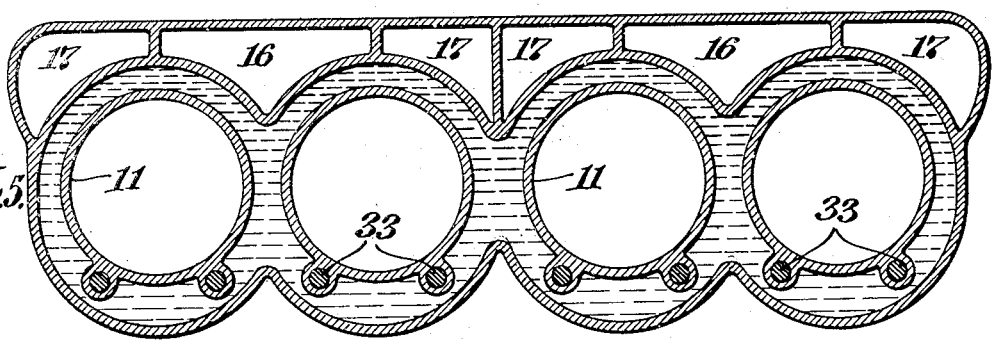
Figure 6:
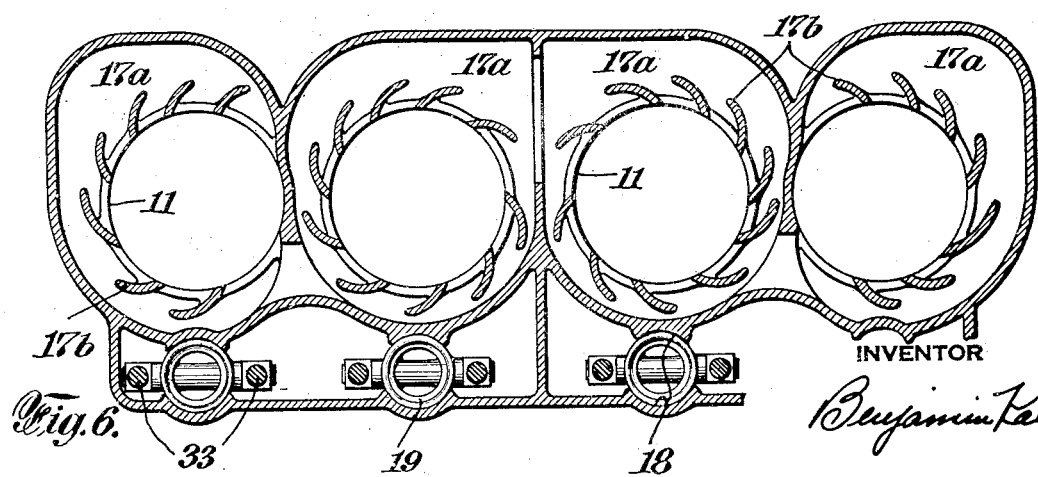

Referring to the drawings and more particularly to Figures 1 to 8, which show as example, the application of the invention to a four cylinder vehicle engine using carburetor induction and super-charging. A suitable crankcase and cylinder block 10 is provided with a plurality of bores 11 adapted to receive main pistons 12 and which reciprocate therein. Substantially midway of each bore 11 are independent air and gas inlet ports 13 and 14 respectively. The gas and air ports may be disposed around the entire circumference of the bore except for the interruption of bridges which assist in guiding piston rings across the ports. A horizontal partition 15 is arranged between the gas and air ports and is preferably continuous around the circumference of the bore, and may be integrally formed with the cylinder block. Suitably positioned and extending along the cylinder block and preferably integrally formed therewith are air conduits and gas transfer passages suitably partitioned from each other and arranged to conduct air and gas to the respective air and gas ports 13 and 14. As seen in Fig. 5, the gas passages 17 may be individually directed to their respective intake ports 14 of the cylinders, and the air conduits 16 are similarly directed to the intake ports 13 of the cylinders but may be arranged to direct the air supply between adjacent cylinders. The belts surrounding each of the intake ports may be individually confined, thus separating the ports of the other cylinder; but as shown in Figure 6 the gas ports may be in common communication. Likewise, the air ports of all the cylinders may be in common communication. The purpose of this will be more fully described later. On the opposite side of the cylinder blocks and integrally formed therewith are a plurality of cross-head casings having cross-head bores 18, adapted to slidably receive cross-heads 19, (Figure 6) each of which are connected as by a short connecting rod 20, to an auxiliary crankshaft 21.

The main pistons are connected by main connecting rods 22 to a main crankshaft 23. Both main and auxiliary crankshafts are positively connected so as to rotate at equal speed and in opposite directions as by the means of engaged gears 24 each affixed to one of the shafts, or the like, thereby providing means to eliminate primary unbalanced forces, as well as unbalanced couples if present, by the use of suitable counterweights 21a and 23a (Figure 2) on the auxiliary and main shafts respectively.

This arrangement of crankshafts turning in opposite directions minimizes the inherent torque reaction of the main piston since it causes torque reaction of the cross-heads 19 to oppose the torque reaction of the main pistons.

An oil pan 25 is secured to the bottom of the cylinder block and a cover 26 is secured to the side of the cylinder block, thereby enclosing the lower portions of the auxiliary crankcase. This cover 26 provides an enclosure and a receptacle for maintaining a level of oil below the auxiliary crankshaft for an oil splash to lubricate the thrust receiving side of the cylinders or bores of both main pistons and cross-heads. Thrust receiving sides 10a of both main cylinder and cross-head cylinder are provided with a plurality of holes 10b thru which oil enters to lubricate the thrust sides of the main pistons and cross-heads.

Secured to the top of the cylinder block is a cylinder head 27 provided with a plurality of exhaust piston bores 28. Two of these exhaust piston bores are shown in communication with each main piston cylinder and the exhaust bores of each power unit are parallel to each other and substantially symmetrically aligned with the cross-head bore axis in the cylinder block. One exhaust piston may be used if desired, as will be shown hereinafter.

Exhaust pistons 29 are adapted to be operated by the auxiliary crankshaft 21, and are adapted to reciprocate in said exhaust bores, and are suitably secured to respective pump pistons 30 which are adapted to reciprocate in pump cylinders 31 bored parallel to the axis of the cross-heads but may be disposed slightly eccentric therefrom. The purpose of this will be explained hereinafter and for the present the axes of the exhaust bores may be considered as being in a common plane with the axis of their cooperating crosshead.

One axis of a cross-head is indicated as $a-b$ in Fig. 1, and is shown as in a common plane to the exhaust pistons 29 and associated parts. The main cylinders or bores are open at the top and the exhaust bores are open at their bottom and are in communication with a combustion chamber $c$.

The axis of the main piston is indicated as $x-y$ and it will be noted that the axis $a-b$ is acutely angular with respect to the axis $x-y$.

In order to reduce the length along the crankshafts of the engine to a minimum, it is essential, as will be later pointed out, to offset the exhaust pistons to one side of the axis $x-y$ in a plane transverse to the crankshaft so that they do not centrally overlie the main piston, as shown clearly in Figure 1. This offset of the exhaust piston enables the formation of an effective combustion chamber which will also be later herein described.

Figure 2:
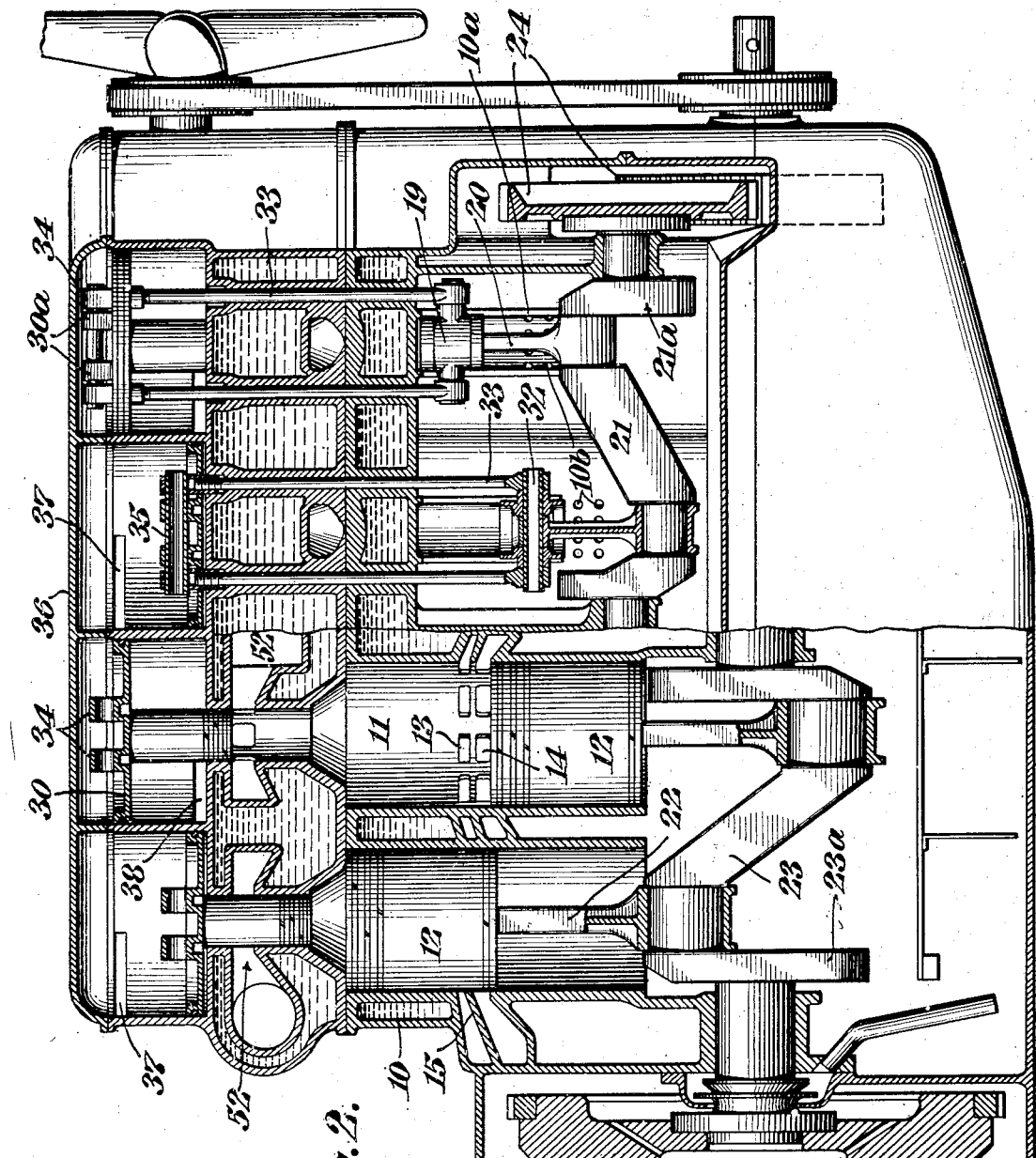
Figure 2 is a longitudinal section through the main cylinder axis in part, and a section through the auxiliary crankshaft and associated parts, of a four cylinder "in-line" engine taken substantially on the line 2—2—2 of Figure 1.
Figure 3:
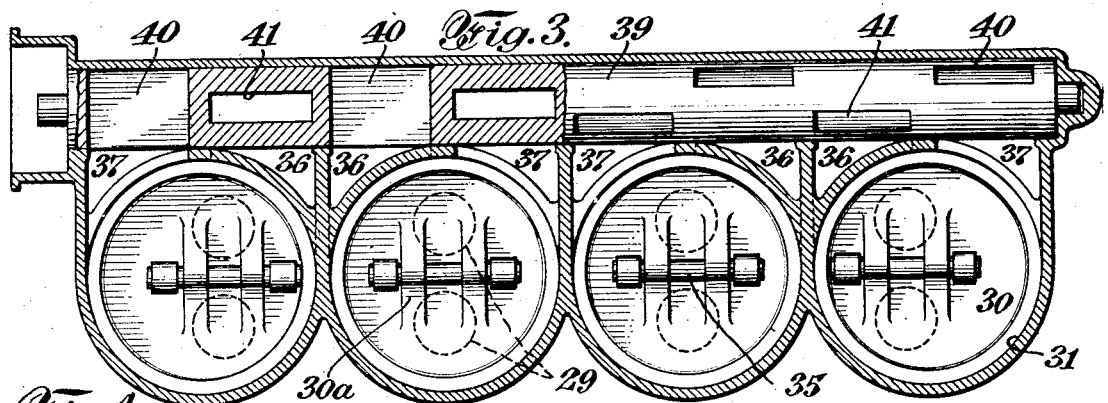

The operating connections of the exhaust and its pumping piston is best described by reference to Figures 1 and 2.

Attached to each of the cross-heads 19, by means of wrist pins 32 at the outer ends thereof, are a pair of tie rods 33, which extend thru the cylinder block and cylinder head. These tie rods may be securely attached at their upper ends by such means as threads, to eye-nuts 34, which embrace the ends of wrist pins 35. These pins 35 pass thru bosses 30a formed in the top of the pump pistons 30. This foregoing arrangement of connecting means between the crossheads and exhaust pistons merely illustrates one applicable form and it will be readily seen that other means may be used.

The pump cylinders 31 are open at the top and are provided with a cover 36 which may extend longitudinally of the entire engine to enclose all of the pump cylinders. Each pump cylinder is provided with communicating ports 37 and 38 at the top and bottom thereof respectively. The top of the pump pistons is adapted to pump a gas mixture, and the bottom to pump scavenging air. The openings 37 and 38 are independently communicative with a rotary valve 39 adapted to be driven in timed relation to the crankshafts by any suitable means (not shown). The drive for the rotary valve is not shown, it being of well known positive drive such as a vertical shaft driven from the crankshaft. This shaft may be provided with the usual oil pump and distributor (not shown).

The rotary valve 39 extends longitudinally of the engine and has a pair of slotted ports 40 and 41 for cooperation with each pump cylinder. The ports 37 are in line with the slotted port 40 and consequently controlled thereby. The ports 38 are similarly controlled by the slots 41. The ports 40 and 41 are arranged substantially at right angles to each other and each pair of slotted ports are phased at 90 degrees. This phasing of the ports is merely an illustrative application to a four cylinder engine as will be readily understood in the art.

The upper side of the pump piston draws gases from a carburetor 46 thru gas manifold 42 (see Figure 1) and discharges said gases under control of the rotary valve through transfer passages 43 which are integrally formed in the cylinder head. The passages 43 are in communication with the gas passages 17 in the cylinder block. The lower side of the pump piston draws air thru the air manifold 44 and discharges the air thru conduits 45 which are integrally formed in the cylinder head. The air conduits are adjacent longitudinally but independent from the gas passages 43 by suitable partitions between the air conduits and gas passages. The conduits 45 are in communication with the air conduits 16 in the cylinder block. These air conduits may be commonly communicative with adjacent pumps.

The gas and air manifolds 42 and 44 have their inlets adjacent each other which permits the attachment of a combined carburetor 46 and air scoop 47, both having a unitary control shaft operable by means of throttle lever 48.

With reference to Figures 3, 4, 5 and 6, the centers of the exhaust pistons are coplanar with the center of their respective main cylinders and these main cylinders are spaced as close as main bearing length and water jacketing permits to produce a short engine. It will be noted that the cylinder distance between the two middle main cylinders is slightly greater than between the outer cylinders. This is due to the necessary provision of a center crankshaft bearing. However, this larger center distance between the middle main cylinders permits the application of pumping pistons of slightly larger diameter than would otherwise be possible. In order to provide the outer or end pumping pistons of equal diameter as the inner pumping pistons, the centers of the outer pumping pistons are arranged slightly outward, lengthwise of the engine, from the center plane of the exhaust pistons to which they are attached. The pumping pistons are preferably thin and hollow, and are relatively light; therefor, the center of gravity of a reciprocating exhaust piston assembly including an offset pumping piston is not shifted sufficiently to appreciably effect the smooth operation of the engine. A gain in pump area and pump capacity is achieved by this enlargement of the inner pumping pistons, and the outward shifting or offsetting of the outer pumping pistons without increasing the length or height of the engine.

Each of the main cylinders in the vicinity of its gas intake ports is substantially surrounded by gas belts. These belts are in communication and thus comprise a gas zone or chamber 17a common to all the gas intake ports and all the gas passages. The gas passages 17, leading to and communicating with this common gas zone or chamber, are independent of each other, and each gas passage of each unit (Figure 5) leads from the upper side of its respective pump to its respective gas belt immediately surrounding its associated cylinder; that is, the gas pumped by the piston of a power unit is fed directly to the gas intake ports of its intake cylinder. The reciprocating pistons in each power unit are in fixed phase relation and are so arranged that at the end of the gas pumping impulse the main piston controlling the intake ports is substantially at bottom dead center, at which time the gas intake ports of that unit are open so that the compressed charge enters the main cylinder under direct impulse of its associated pumping piston. By this arrangement, most of a compressed and saturated gas charge is confined in its associated gas passages 43 and 17, and the major portion thereof is directed into its associated cylinder without great dispersion into the common gas zone or chamber. The first or leading portion of a gas charge may disperse into the common gas chamber during the initial part of the pumping impulse, but the major portion of the saturated charge will enter its respective cylinder, being that the gas intake ports of the cylinder are arranged to be open during substantially the entire gas pumping impulse. The valve 39 is arranged to permit communication between the pumping cylinder and the gas passages during this gas pumping impulse.

The cylinder pressure in any cylinder during the initial opening period of its inlet ports is about atmospheric, and at the same period the gas chamber, as well as the communicating gas passages, are under slight pressure. The opening of the gas inlet ports of any cylinder causes a direct surge of the previously remaining gas in the gas zone immediately surrounding these inlet ports and, because the gas pumping impulse is effective during the time the gas inlet ports are open, the major portion of the gas charge is pushed into its associated cylinder. A small amount of each gas charge issuing from the pump will disperse into the gas zone before the initial opening and after the final closing of the gas inlet ports.

After a cylinder is filled with a fresh charge of gas and just prior to the closing of its gas intake ports, the pressure in the cylinder and in the gas zone is substantially equal and slightly greater than atmospheric. The pressure, therefore, of the gas zone immediately prior to the opening of the next to open gas intake ports, is about atmospheric; and during entry of the gas from the gas zone into this cylinder, the gas inlet pressure is supplemented by the pumping impulse of its pumping piston.

By providing a common gas chamber, and individual pumps and associated independent gas passages to the gas chamber, a substantially even distribution of the fuel charge qualitatively and quantitatively is attained. If the delivering capacity and quality of any one of the pumps is lower than the rest, or if all of the individual pumps deliver varying quantities and qualities of gas, which may be due to manufacturing inaccuracies or for any reason whatever, the cylinders receive a substantially equalized quantity and quality of fuel under substantially the same pressure, irrespective of the qualitative and quantitative delivery to the gas passages of the individual pumps, because each charge is equalized in the common gas zone with the previous and subsequent charges.

The air conduits are preferably open to an air zone arranged similar to the gas zone which it overlies and from which it is separated by the horizontal partition 15. In the arrangement shown in Figure 1, and in view of the condition that the gas pump impulse takes place during the open position of the gas intake ports, it follows that the air pump impulse takes place during the closed position of its associated air intake ports. Most of the air under pressure, provided by an impulse of the pump piston of any unit, does not enter its associated cylinder but enters the main cylinder of another power unit. Part of the air during an impulse enters the air chamber or zone to build up the pressure during the time when all air intake ports are closed. Air under direct piston impulse enters the cylinder of another unit during its impulse stroke.

Due to the fact that the air inlet ports are open a shorter period than the period required to complete a stroke of the piston, the air is somewhat stored and pressure is built-up which tends to equalize the air pressure in the air zone during the operation of a deficient pump piston. During operation and during the period near the end of an expansion stroke of any one cylinder, its exhaust valve opens first to relieve the pressure and to permit exit of the burned charge. The pressure within the cylinder then drops below the pressure of the incoming air prior to the opening of the air inlet ports. The air inlet ports are then opened and a charge of pure air, supplemented by a pump impulse of one or the other of the pump pistons is admitted. This aids in pushing the tail end of the burned gases out. Upon further downward movement of the main piston the fresh gas mixture enters. This mixture may be over-rich to mix with the incoming pure air to form a proper combustible mixture. The combustible mixture is preceded by a layer of substantially pure air. This air layer serves as a separation between the outgoing burned gas and the subsequent incoming fresh combustible mixture. This prevents diffusion between the fresh and burned charges. On the up-stroke of the main piston, the exhaust valves are then closed. A portion of the leading separating air layer may be permitted to escape thru the exhaust ports which assures complete scavenging of the burned charge without loss of any of the fresh gas charge. In order to prevent diffusion of the charges due to the high velocity of entry of the air, it is essential that the air should not be directed toward the exhaust ports which would cause piercing the exhaust gas. To this end the air and gas ports are provided with deflectors 16b and 17b respectively to impart a swirling motion to the air and gas in a plane parallel to the piston top and tangential to the cylinder walls.

As stated above the air ports are first to open followed by the opening of the gas ports. While the gas is entering, air is also entering and mixing with the incoming gas. After the gas ports close, air only enters the cylinder.

The deflector vanes around the air ports may be suitably arranged by proper angulation, to a degree where the rising speed of the swirling column of fluid moving toward the exhaust ports is as low as possible without materially decreasing the tangential velocity and rotational swirl of the air charge; to maintain a desirable stratification of the entering fluid; to prevent the intermixture of the leading layer of incoming air with the exhaust gases. This desired high tangential velocity, particularly of the air charge, principally determines the angularity of the air deflectors. The gas deflectors may be arranged to cause the inlet gases to flow into the cylinder in unison with the air, thereby maintaining this high degree of swirl of the incoming charge in the main cylinder.

Intermixture of gas and air is obtained since the gas column in spiraling into the main intake cylinder passes the charging air ports. After the gas ports are closed a layer of air enters the main cylinder and is interposed between the air-gas mixture and the piston top because the air ports are last to close.

It is well known that the rotational turbulence or swirl is not retarded during compression, and the layer of air last entering will be substantially fully mixed with the previously entered air-gas charge by the time the compression stroke is completed.

Any degree of rotational turbulence desired may be obtained since the arrangement illustrated permits of any desired deflector angularity to be easily incorporated in the design.

The combustion chamber is free of pockets which would retard the turbulence, and has a relatively small surface area compared to its volume, a condition which reduces the heat losses. The shape of the combustion chamber, due to the lateral displacement of the exhaust piston means and its angular relationship with the main piston, is substantially frusto-conical, thus providing a shape which is readily adaptable for fuel injection.

Relatively large exhaust ports 51, as shown best in Figures 1 and 4, are provided for each of the exhaust pistons. Suitable exhaust passages 52 and 53 are provided in the cylinder head which conduct the hot gases toward a common outlet pad on one side of the head. These passages are adapted to communicate with an exhaust manifold (not shown).

The exhaust ports communicating with the conduits 53 are arranged slightly lower in order that they open slightly earlier than the exhaust ports communicating with exhaust conduit 52. This causes the initial passage of the exhaust gases when hottest, thru the short conduit 53, and thereby reduces the heat radiation into the cooling medium of both exhaust conduits. The location of the spark plug 54 is preferably near these exhaust ports which open early. Due to the greater inertia of the exhaust column going out of said short conduit it is assured that all of the burned charge surrounding the plug is carried out as they are first to open and last to close and consequently insures a fresh gas charge surrounding the plug.

By placing the pump and exhaust valve gear and its associated parts angularly with respect to each of the main cylinders, and alongside thereto, permits the use of a double acting piston pump of the cross-head type drive, where the cross-head is remote from the vicinity of the hot combustion chamber and capable of ample lubrication by the splash of the auxiliary crankshaft.

The use of the cross-head eliminates any side thrusts on the pump piston and exhaust pistons, which reduces the friction and makes possible the effective operation of the parts in the hot zone, with the minimum of lubrication.

In the form of engine shown in Figure 9, the novel arrangement of the main auxiliary crankshaft and their associated parts is similar in principle to the form previously described except for certain differences of detail construction which materially reduces the cost of production.

Although two exhaust pistons have been shown in the previous form, a construction resulting in maximum specific output, two pistons are not essential for commercial engines where cost of production is paramount; even at the expense of a slight decrease in performance.

To that end automatic feather valves have been substituted for the mechanically driven rotary valve and a single exhaust piston has been substituted for the two exhaust pistons. Furthermore, the pump cover and gas manifold are combined into one casting and the conduit coverings have been greatly simplified in the head and entirely eliminated in the cylinder block. The pump piston has no piston sealing ring and the pumping piston area has been increased to compensate for the leakage due to the lack of piston sealing means. The length or height of the engine has not been increased due to the application of square pumping pistons. In this construction no friction exists between the pumping piston and the square pump cylinder walls due to absence of piston sealing rings.

The description of this form of engine will be limited to a single cylinder, it being understood that other arrangements of the invention can be obtained by multiplication of the unit structure such as the in-line type. It will be later shown how the particular unit structure can be also multiplied in a plane transverse to the crankshaft without departing from the spirit of the invention comprising said unit construction, and in so doing lends itself to the dual use of certain elements in a most efficient manner. Only those elements that differ from the previous form in obtaining the objective will be emphasized hereinafter.

The cover 26a provides the outer half of the cross-head bore surface at its upper portion on the anti-thrust side. This cover is suitably secured to the cylinder block 10 on the side and is readily accessible. When removed it exposes the auxiliary crankshaft 21, connecting rod 20, cross-head 19, wrist pin 32 and the lower ends of the tie rods 33. This permits inspection and ease in assembly.

A casting 55 provides an air chamber 56 and gas conduit 57 which are integrally formed with a partition 58 which separates the two. The lower end of the partition 58 is contiguous with the partition 15 of the cylinder block. The air chamber and gas conduits communicate with the air and gas intake ports 13 and 14 respectively. The casing 55 is adapted to be secured to the cylinder block 10 and the cylinder head 27.

The upper part of the air chamber 56 is adapted to communicate with an air passage 59 formed in the cylinder head. The upper part of the gas conduit 57 is adapted to receive a tubular gas conduit 60 the upper end of which, is received in a casting 61. The casting 61 serves as a cover for the pump and has formed therein a gas intake conduit 62 between the pump and the tubular gas conduit 60.

Secured between the cylinder head 27 and the casting 61, is a tubular pump casing 31a which is of rectangular shape to receive a suitable pumping piston 30b.

Gaskets 64 are interposed to seal the open ends of the pump casing. These gaskets serve as mounting means for automatic feather valves.

As shown in Figure 11, the gaskets 64 are provided with openings 65 each of which are covered on opposite sides of gasket 64 by a spring flap 66. An opening 67 in the lower gasket permits the passage of an exhaust piston 29a. The upper and lower gaskets 64 are identical except that there is no opening 67 in the upper gasket.

The exhaust piston and pump piston are integrally formed and are hollow. A pump piston cover 68 is secured to the open end to eliminate dead space.

An air inlet conduit 69 is formed in the head which is in communication with an air scoop 47a at one end and an inlet feather valve A at the other. This feather valve automatically permits air to enter the pump on the under side of the piston 30b. An outlet feather valve B automatically permits this air to be discharged under the influence of the reciprocation of the pump piston. The discharged air passes through the passage 59 and into the storage chamber 56. It will be seen that during the expansion stroke of a single cylinder engine the air is drawn under the pump piston. The previous charge of air in the storage chamber 56 under pressure is released into the main cylinder at the end of the stroke. The air remaining in the storage chamber at the end of the stroke is at about atmospheric pressure. Upon the up stroke of the main piston and simultaneous down stroke of the exhaust piston the air is again forced into the chamber 56 to build up the pressure for the next charge.

The gas is drawn in on top of the pump piston on the compression stroke thru the carburetor 46a by way of the conduit 62 and thru the inlet feather valve C. During the expansion stroke the gas is forced thru the outlet feather valve D by way of conduit 63, tubular conduit 60 and conduit 57 into the gas intake port 14. This means of charging is similar to that previously described except for the positive control provided by the use of a rotary valve in the former.

During the end of an expansion stroke the air enters first and is followed by the gas charge which enters under the direct pulsating influence of the exhausting pump piston. During the initial part of the compression stroke the gas ports are first closed and the still open air ports do not feed any air since the chamber 56 has been exhausted during the expansion stroke. This sequence of scavenging and charging interposes all of the scavenging air between the outgoing burnt gases and the fresh gases. This is termed primary air scavenging. There is no air following the gas into the cylinder.

A multicylinder engine of this construction with individual air storage chambers in direct communication with their respective cylinders, and having the same sequence of operation as heretofore described, will have a primary air scavenging and charging effect, i. e., a primary layer of air which constitutes the entire pump capacity will be interposed between the outgoing burned charge and the fresh gas.

It will therefor be noted that in a multicylinder engine constructed in accordance with this invention, primary air scavenging may be accomplished with the use of individual air conduits that enter directly into the main cylinder, irrespective of method introduction of gas which may be introduced by individual gas conduits directly into the cylinder, or by the use of a common gas zone interposed between all the gas conduits and communicating with all the intake ports of all the cylinders.

With reference to the manner of air and gas introduction previously described in Figure 1, the sequence of introduction was, a layer of primary air, followed by a layer of gas and air, and last, a layer of secondary air. This is termed primary and secondary air scavenging. This sequence of introduction may be accomplished when a common air belt is employed, irrespective of the method of introduction of gas which may be introduced by individual conduits, or by the use of a common zone.

It follows then, that primary air scavenging or primary and secondary air scavenging is not dependent upon the manner of gas introduction and is respectively possible by the use of either individual air conduits to the air intake ports of each cylinder or by the use of a common air zone connecting all air intake ports of the separate cylinders.

High or low pressure gas introduction may be respectively obtained by the use of either individual gas conduits direct to the separate cylinders or for high pressure gas introduction or by communication of the gas conduits for low pressure gas introduction to the common gas belt.

Therefore, it will be apparent that many novel arrangements and varying methods of air and gas introduction for most effective application of various types of engines can be had.

Referring again to Figure 9, there is suitably arranged in the air scoop 47a, an air throttle provided with a controlling lever 72. The carburetor 46a is also provided with a controlling lever 73. These controlling levers may be connected in any well known manner to meet the desired air and gas ratio requirements over a wide operating range.

In Figure 12 the novel arrangement of unit structure is shown as applied to form a V type engine.

The main piston and exhaust pistons and their associated parts are similar to that shown in Figure 1, where two exhaust pistons are used. The pumping arrangement has been omitted.

The V type engine illustrates the multiple application of the unit structure principle in a plane transverse to the crankshaft. It is understood that additional banks of units may be arranged in line with the main crankshaft.

In this type of engine a single auxiliary crankshaft is used for operating two exhaust piston means in each bank of V units. In this form the air charge of the cylinders may be supplied by an independent blower and the fuel may be supplied by fuel injectors, (not shown) and therefore the pump piston may be omitted as well as the air and gas conduits associated with the pump. The main feature of this form is the use of two exhaust pistons to reduce the heat receiving areas without materially reducing the exhaust port circumference.

In this form two symmetrical cylinder blocks 100 are suitably secured and are adapted to support at their common meeting faces a main and auxiliary crankshaft 101 and 102 respectively. A main cylinder bore 103 in each block is in line with the main crankshaft and is angularly disposed to its supplementary bore 103a. The crankshaft 102 has two crank throws 102a and 102b for each crank throw of the main crankshaft. Air intake ports 104 in the cylinder blocks are controlled by the main pistons 105. The exhaust ports 106 are located in the cylinder heads 107. These ports are controlled by two exhaust pistons 108. By using two exhaust pistons each of about one half the circumference of the intake piston, the heat-exposed face area of the exhaust pistons is about one-half the area of the heat receiving face of the intake piston. The combined circumference of the exhaust pistons is about equal to the circumferences of the main intake piston. By this means there is no sacrifice of port capacity, (since there is no reduction in exhaust port circumference) and a considerable reduction in heat receiving area of the exhaust pistons is accomplished.

Connections between the exhaust piston 108 and the auxiliary crankshafts 102 are similar to those shown in Figure 1. A cover 109 is suitably secured to keep the ends of the exhaust pistons dust free and oil tight. By removing the cover the exhaust pistons are easily accessible which are also easily removed merely by removing the wrist pin 35b.

In the modification shown in Figure 16 the novel piston arrangement and connection means is shown as applied to an "opposed" type engine. All parts of this engine may be similar to the previously described modification, of Figure 12, except that the angular disposition of the two main pistons is 180 degrees. The main feature being the use of a single auxiliary crankshaft cooperating with angularly disposed operating means for auxiliary exhaust pistons disposed angularly with the main intake piston; the crankshafts being substantially alongside each other to form a substantially short and compact engine.

In the modification shown in Figure 13 the novel piston arrangement and connecting means is shown as applied to an X type engine. This form of engine is similar to that shown in Figure 12 except that some of the parts have been duplicated on the opposite side of the crankshaft.

A fuel injector system is shown attached to this form to show the simplicity of its incorporation in an engine without substantial increase in frontal area thereof. It is to be understood that additional banks of X units may be arranged in parallel planes along and tranverse to the main crankshaft.

In this type of engine one main crankshaft is used for operating four main pistons in each bank. Two auxiliary crankshafts on opposite sides of the main crankshaft are employed to operate the auxiliary pistons. Each auxiliary crankshaft has two crank throws, each throw operates an exhaust piston means as illustrated in Figure 12. Any two of the opposite acute V spaces formed between the cylinders are partitioned as at 111 and covered as at 112 to form storage chambers 113 for receiving and distributing air which may be supplied by any suitable blower at the end of the main crankshaft and distributed to the inlet openings 114, which communicate with the chambers 113.

Fuel pumps 115 operated by cam shafts 116 may be provided in the spaces formed by the extending cylinder blocks adjacent the auxiliary crankshaft. The fuel pumps may be operated directly from the auxiliary crankshafts as illustrated by dot and dash lines. The upper crank case 117 embraces one half of the engine and two quarter sections 118 form the lower crank case. Thru-bolts 119 extend vertically thru the upper and lower crank cases and horizontal thru-bolts 120 extend thru the two quarter sections 118. It will be apparent that by eliminating the lower half of the X type engine a V type engine having an acute angle of cylinder separation is easily obtained. Simple means of lubricating the crankshaft bearings is illustrated in this modification, which includes oil supply tubes 121 held between the meeting flanges of the upper and lower sections. Oil grooves 123 in the upper and lower flanges form a passageway for the oil for said crankshafts.

In the modification shown in Figure 14, the piston arrangement is similar to that shown in Figure 13, and is of the same type. The engine here shown is also adapted for fuel injection, except the air scavenging and charging is effected by individual air pumps connected to the exhaust pistons.

The exhaust pistons 121 are operably connected to the pump piston 122 which is suitably encased in a housing 123 secured to the cylinder heads. Integrally formed with the housing 123 is an air chamber 124, which may be supplied by an air scoop (not shown) in the front of the engine.

Under control of a rotary valve 125 the air may be alternately distributed to the upper and lower side of the pump piston by way of passages 126 and 127 respectively. The rotary valve is arranged to control the alternate discharges of said pump by way of passages 128 into a storage chamber 129 which communicates with the inlet ports 130. Any type of fuel injection (not shown) may be used with this engine and it will be particularly noted that the novel piston arrangement is easily adaptable to operate in conjunction with a pump handling air only on both sides of the pumping piston.

In the form shown in Figure 15, the engine is adapted for use with a carburetor induction system using two stages of gas and air introduction. This form is similar to that shown in Figure 1, except that means have been provided to adapt the use of additional blowers for the air as well as the gas prior to entry into the pump housing. These blowers may be of the usual centrifugal type, (not shown) which directs air under initial pressure into air passages 131 and also similarly directs gases into the conduits 132. The gas and air are further compressed by the pump pistons 133 in a manner previously described in Figure 1.

The gas is transmitted thru intercoolers 134 by way of conduit 135 into the gas zone 136. These intercoolers increase the volumetric efficiency of the engine by decreasing the temperature of the compressed incoming gas.

This engine is intended for high altitude application as will be readily understood in the art.

The engine shown in Figure 17 is another modification. This form is in principle similar to that shown in Figure 12, except that an intake piston arrangement has been added to form a "diamond" shape engine. A pair of main pistons 105a and a crankshaft 101a have been added to the structure of Figure 12, thereby producing an engine of greater power and wherein the auxiliary crankshaft 102 and exhaust pistons 108 serve dually.

It is to be understood that more than two exhaust pistons may be employed without departing from the spirit of the invention and that various other changes may be made without departing from the invention as pointed out in the following claims.

Having thus described the invention, what is claimed as new and desired to secure by Letters Patent, is:—

1. A two-stroke cycle internal combustion engine including a combustion chamber, a cylinder communicative with said combustion chamber, an inlet-controlling piston in the cylinder, a cylinder head, a plurality of power-contributing and exhaust-controlling pistons in the head, a single crank operably associated with the inlet controlling piston, and a single crank for the exhaust-controlling pistons.

2. A two-stroke cycle internal combustion engine including a combustion chamber, angularly disposed cylinders commonly communicative with the combustion chamber, piston means in the cylinders, and operably connected crankshafts independently operable with each piston means, one of said piston means comprising a plurality of pistons.

3. A two-stroke cycle internal combustion engine including a cylinder, a combustion chamber, angular working piston means commonly communicative with the combustion chamber, operably connected crankshafts independently operable with each of the angular working piston means, one of said piston means comprising a plurality of pistons, and fluid pumping means secured directly to said last mentioned piston means.

4. A two-stroke cycle internal combustion engine including a cylinder, a combustion chamber, angular working piston means commonly communicative with the combustion chamber, operably connected crankshafts independently operable with each of the angular working piston means, and fluid pumping means secured directly to one of said piston means.

5. A two-stroke cycle internal combustion engine including a plurality of combustion chambers, a plurality of exhaust-controlling piston means, inlet-controlling piston means, one of each of said piston means associated with each combustion chamber, inlet ports for each of the inlet-controlling piston means, a fluid pumping means secured directly to each of the said exhaust-controlling piston means, and a common fluid receiving chamber immediately surrounding all of the inlet ports.

6. A two-stroke cycle internal combustion engine including a plurality of cylinders, inlet ports in each of the cylinders, exhaust-controlling pistons in each of the cylinders, fluid pumping means secured directly to each of the exhaust-controlling pistons, and a common fluid receiving chamber immediately surrounding all of the inlet ports and communicative with said fluid pumping means.

7. A two-stroke cycle internal combustion engine including a plurality of cylinders, pistons in each of the cylinders, inlet ports in each of the cylinders, a common chamber surrounding all of the inlet ports, an independent fluid compressing means associated with each of the cylinders, and independent passages from the fluid compressing means to the common chamber, said passages having outlets adjacent their respective inlet ports.

8. A two-stroke cycle internal combustion engine including a power unit comprising a plurality of communicating cylinders, power-contributing pistons in the cylinders, independent reciprocating fluid pumping means associated with each of the cylinders, said pumping means adapted to pump air and gas alternately on respective alternate strokes, and means for controlling the passage of air and gas to the cylinders.

9. A two-stroke cycle internal combustion engine including a plurality of cylinders, pistons in the cylinders, an independent reciprocating fluid pumping means associated with each one of the pistons, said pumping means adapted to pump air and gas alternately on respective alternate strokes, and automatic one-way flap valves associated with pumping means for directing the flow of air and gas thru the pumping means.

10. A two-stroke cycle internal combustion engine including a cylinder, a combustion chamber, a port-controlling main working piston in the cylinder communicative with the combustion chamber, a plurality of working and port-controlling pistons communicative with the combustion chamber, said plurality of pistons moving angularly to said main piston, and a cross-head operably associated with the plurality of pistons and disposed alongside of said cylinder, all of said elements being disposed in a common plane.

11. A two-stroke cycle internal combustion engine including a cylinder, a crankshaft, a combustion chamber, a main piston in the cylinder communicative with the combustion chamber and operatively associated with the crankshaft, a plurality of port-controlling pistons communicative with the combustion chamber, and a cross-head operably associated with the latter and disposed alongside the cylinder, all of said elements excluding the crankshaft being disposed in a common plane transverse to the crankshaft.

12. A two-stroke cycle internal combustion engine including a cylinder, an inlet port-controlling piston in the cylinder, an exhaust port-controlling piston, a combustion chamber communicative with both pistons, separate air and gas ports in the cylinder controlled by the inlet-controlling piston, the air ports being disposed above the gas ports, whereby the air ports are opened prior to the opening of the gas ports and closed after the gas ports are closed by said inlet controlling piston, and a double acting pump piston connected directly to the exhaust piston for supplying air and gas to the respective air and gas ports.

13. A two-stroke cycle internal combustion engine including power contributing exhaust-controlling piston means comprising a plurality of pistons, an intake controlling piston, a combustion chamber communicative with the intake and exhaust pistons, and a single crank means operably associated with the exhaust piston means.

14. A two-stroke cycle internal combustion engine including an exhaust-controlling piston means comprising a plurality of pistons, a combustion chamber communicative with said pistons, a double acting fluid pump operatively and directly connected with the exhaust-controlling piston means, and air inlet ports adjacent to gas inlet ports, said air and gas ports being fed by the pump.

15. A two-stroke cycle internal combustion engine including a combustion chamber, a plurality of cylinders commonly communicative with the combustion chamber, adjacent air and gas intake ports in one of the cylinders, exhaust ports in a plurality of the other cylinders, and means whereby air under stored pressure and gas under impulse pressure are admitted into the cylinders.

16. A two-stroke cycle internal combustion engine including a combustion chamber, a plurality of cylinders commonly communicative with the combustion chamber, pistons in the cylinders, said cylinders including an intake cylinder, adjacent air and gas intake ports in the intake cylinders, means for compressing a charge of gas during the expansion stroke of the pistons and for compressing a charge of air during the compression stroke of the pistons, and means whereby the compressed air is first to enter into the cylinder followed by the compressed gas.

17. An internal combustion engine including a combustion chamber, an exhaust-controlling means communicative with the combustion chamber, a double acting fluid pumping means secured to the exhaust-controlling means adapted to pump fluid on both strokes, a fluid supply chamber for supplying fluid to the pump, a fluid receiving chamber for receiving fluid discharged by the pump, and valve means for controlling the passage of fluid to and from the pumping means.

18. An internal combustion engine including a combustion chamber, an intake cylinder communicative with the combustion chamber, an exhaust-controlling means communicative with the combustion chamber, a double acting fluid pump adapted to pump air on one stroke and gas on the other secured to the exhaust-controlling means, and independent passages for the air and gas between the pump and the intake cylinder.

19. An internal combustion engine including a combustion chamber, an intake cylinder communicative with the combustion chamber adapted to receive air and gas, an exhaust-controlling means communicative with the combustion chamber, a pump secured to the exhaust-controlling means adapted to pump air on one stroke and gas on the other, independent passages for the air and gas between the pump and the intake cylinder, and cooling means for the gas passage.

20. An internal combustion engine including a plurality of cylinders, a pump for each cylinder adapted to pump air on one stroke and gas on the other, air inlet ports in each cylinder, gas inlet ports adjacent the air inlet ports in each cylinder, a common gas belt surrounding the gas inlet ports for receiving gas under pressure from all the pumps, and independent air passages from the pumps to their respective air inlet ports.

21. An internal combustion engine including a plurality of cylinders, a pump for each cylinder adapted to pump air on one stroke and gas on the other, air inlet ports in each of the cylinders, a common air belt surrounding all the air inlet ports for receiving the air under pressure from all the pumps, gas inlet ports in each of the cylinders adjacent the air inlet ports, and independent gas passages from the pumps to their respective gas inlet ports.

22. An internal combustion engine including a plurality of cylinders, a pump for each cylinder adapted to pump air on one stroke and gas on the other, air inlet ports in each cylinder, a common air belt surrounding all the air inlet ports for receiving air under pressure from all the pumps, gas inlet ports in each cylinder, and a common gas belt surrounding all the gas inlet ports for receiving gas under pressure from all the pumps.

23. A two-stroke cycle internal combustion engine including a plurality of cylinders, pistons in the cylinders, independent air compressing means directly associated with each of the pistons and adapted to reciprocate therewith, means for compressing a charge during the compression stroke of the engine, a common storage chamber for compressed charges and means for admitting a compressed charge to the interior of the cylinders substantially at an end of the expansion stroke of a piston.

24. In an internal combustion engine, a combustion chamber, a plurality of power contributing pistons communicative with the combustion chamber, a single fluid pumping piston connected to the power-contributing pistons, and connecting rod means for the pistons having a connection between the pumping piston and the power contributing pistons.

25. In an internal combustion engine, a combustion chamber, a plurality of joined power-contributing piston means disposed side by side and communicative with the combustion chamber, a double acting fluid pumping piston connected to the power contributing piston means, and connecting rod means for the pistons having a connection between the pumping piston and the power-contributing pistons.

26. In an internal combustion engine, a plurality of power-contributing pistons, a single fluid pumping piston connected directly to the power-contributing pistons, and connecting rod means for the pistons having a connection between the pumping piston and the power-contributing pistons.

27. In an internal combustion engine, a power-contributing piston means, a double acting fluid pumping means associated with the piston means, and a single valve having two ports each cooperating with one side of the pumping means for controlling the inlet and exhaust to and from their respective sides of the fluid pumping means.

28. In an internal combustion engine the combination including a power-contributing piston, a double acting fluid pumping means associated with the piston, fluid supply means for the pumping means, a working cylinder communicative with both sides of the power-contributing piston, and a single valve means having two ports each cooperative with one side of the pumping means and each port controlling the fuel from the supply means to the pumping means and from the pumping means to the working cylinder.

29. In an internal combustion engine, the combination including a power contributing piston means, a double acting pumping means connected to the piston means and adapted to pump air on one stroke and a gas mixture on the other, fluid supply means for the pumping means, a working cylinder communicative with the piston means, independent conduits for directing air and a gas mixture to said working cylinder from the pumping means, and cooling means around the gas conduit.

30. In an internal combustion engine, a power contributing piston means, a double acting pumping means connected to the piston means and adapted to pump air on one stroke and gas on the other, fluid supply means comprising conduits for supplying compressed air and a compressed gas mixture to the respective sides of the pumping means, a working cylinder communicative with the piston means, independent conduits for directing the air and gas to said working cylinder from the pumping means, and cooling means around the gas conduit.

31. In an internal combustion engine, a power contributing piston means, a double acting pumping means associated with the piston means, a fuel supply means and an air supply means for the pumping means, and a valve for controlling the inlet and exhaust of fuel to and from one side of the pumping means and for controlling the inlet and exhaust of air to and from the other side of the pumping means.

32. In an internal combustion engine, a power contributing piston means, a double acting pumping means associated with the piston means adapted to receive air on one stroke and gas on the other stroke and adapted to discharge air and gas on alternate strokes, air supply means for the pumping means, a gas mixture supply for the pumping means, and means for variably controlling the supply of air and the gas mixture to the fluid pumping means in a predetermined ratio.

33. In an internal combustion engine, the combination including a combustion chamber, angularly disposed cylinders communicative with the combustion chamber, an air inlet controlling piston means in one of the cylinders, an exhaust controlling piston means in the other cylinder, operating means associated with the exhaust piston disposed substantially alongside the inlet piston, and liquid fuel injecting means for supplying a spray into the combustion chamber.

34. In an internal combustion engine, the combination including a combustion chamber, angularly disposed cylinders communicative with the combustion chamber, said combustion chamber being substantially triangular in outline in a plane common to cylinders, opposed pistons in the cylinders having working faces parallel to the outlining faces of the combustion chamber, operating means for the pistons disposed at an acute angle to each other, said angularity of the cylinders being such that the working faces of the pistons are disposed at an acute angle.

35. In an internal combustion engine, two parallel crankshafts, a pair of power units operably associated with the crankshafts, each power unit comprising a plurality of angularly disposed cylinders, a combustion chamber communicative with the cylinders, an intake-controlling piston means in one of the cylinders, an exhaust-controlling piston means in the other cylinder, one of said crankshafts adapted to be operated by the inlet controlling piston means of both power units, and one of the crankshafts adapted to be operated by the exhaust-controlling piston means of both power units, separate crankpins on one of the crankshafts for one of the piston means, and a single crankpin on the other crankshaft for the other piston means.

36. In an internal combustion engine, three parallel crankshafts, a pair of power units operably associated with the crankshafts, each power unit comprising a plurality of angularly disposed cylinders, a combustion chamber communicative with the cylinders, intake-controlling piston means in some of the cylinders, exhaust-controlling piston means in some of the cylinders, a single crankpin on the crankshafts associated with the intake-controlling pistons of each of the power units, and a separate crankpin on the crankshaft associated with the exhaust-controlling pistons of each of the power units.

37. A two-stroke cycle internal combustion engine including a combustion chamber, a power contributing and intake-controlling piston, a plurality of power contributing and exhaust-controlling pistons commonly communicative with the combustion chamber, and a single crank for operating the exhaust-controlling pistons.

38. A two-stroke cycle internal combustion engine including a plurality of sets of cylinders, pistons in the cylinders, an air compressing means operatively associated with each set of cylinders for compressing a charge of air during the compression stroke of the pistons, and means whereby air is admitted to each of the sets of cylinders substantially at the end of the expansion stroke under direct impulse of one of said air compressing means.

39. In an internal combustion engine, a combustion chamber, angular disposed cylinders communicative with the combustion chamber, said combustion chamber being substantially triangular in outline in a plane common to the cylinders, a single intake piston in one of the cylinders having a working face forming a substantial part of one side of the triangular outline, an exhaust piston working face forming a substantial part of a second side of the triangular outline of the combustion chamber, and fuel injection means disposed substantially in the corner of the outline between said second side and an uninterrupted wall joining the first two sides.

BENJAMIN KAHN.